Patented May 24, 1938

2,118,054

UNITED STATES PATENT OFFICE 2,118,054

OPTICAL ISOMERS OF ACYL-β-ALKYL CHOLINE SALTS AND INTERMEDIATES AND PROCESSES FOR THEIR PRODUCTION

Randolph T. Major, Plainfield, and Howard T. Bonnett, Rahway, N. J., assignors to Merck & Co. Inc., Rahway, N. J., a corporation of New Jersey No Drawing. Application July 6, 1935, Serial No. 30,150

7 Claims. (Cl. 260—25)

This invention relates broadly to processes for preparing acyl-β-alkyl-choline iodides and salts of acids whose silver salts are more soluble than silver iodide (specifically exemplified by processes for the production of acetyl-β-methyl-choline chloride), and relating more particularly to optical isomers thereof and methods for their preparation.

The co-pending application of one of us, Randolph T. Major, in association with Joseph K. Cline, Serial No. 733,604, filed July 3, 1934, relates to the preparation of the racemic form of acetyl-β-methyl choline chloride.

Theoretically, it should be possible to prepare two optically active forms of this and related choline compounds when they contain an asymmetric carbon atom. Since it is generally recognized that one of the optical isomers of a medicinal chemical is usually much more active physiologically than the other, it was considered desirable to attempt the production of the theoretically possible optical isomers.

Pharmacological tests with the optical isomers of acetyl-β-methyl choline chloride show that the physiological action of the d-form is stronger than even the racemic form; whereas the laevo form is considerably milder. Thus the production and isolation of both forms, together with the known racemic form, afford to the medical profession a much wider range for accurate dosage and control with these highly potent drugs.

The results of our experiments indicate that the most satisfactory method of producing these isomers, is to prepare them from the corresponding optical isomers obtained by resolving the racemic dimethylaminoisopropanol by appropriate means, as will further appear, into its d- and l-forms, and to convert them, respectively, into their corresponding methyl choline iodides. Thereafter, we may prepare the chlorides or other salts from the iodides and then acetylate the respective compounds, as may be required. Proceeding in this manner, the optical isomers of acetyl-β-methyl choline chloride are obtained as white crystalline hygroscopic solids;— the d-form having a melting point of 200–201° C. and an optical rotation, $$(\alpha)_D^{25} = +41.9°$$

and the l-form a melting point of 201–202° C. and a rotation, $$(\alpha)_D^{25} = -41.3°$$

Equal quantities of the d- and l-forms showed a mixed melting point of 172–173° C., which corresponds to the melting point established by Major and Cline for the racemic form, i. e., 172–173° C.

The process as above described may also be applied to the production of other salts. Obviously, such other salts of acids may be thus prepared where the acid involved is one whose silver salts are more soluble than silver iodide.

The following description of the more detailed steps of the process exemplifies the general method as directed more particularly to the ultimate production of both optical isomers of acetyl-β-methyl choline chloride.

Resolution of dimethylaminoisopropanol

Dimethylaminoisopropanol, is known to be racemic and its resolution into the d- and l-forms is accomplished by us in the following manner:

*d-form.*—Dimethylaminoisopropanol, having a boiling point of 124–126° C., is treated with 5% excess bromo-camphorsulfonic acid in ethyl acetate solution. The salt is recrystallized from a mixture of 5 cc. ethyl acetate and 1 cc. absolute alcohol per gram of salt, its rotation becoming constant at +83.5°. The dextro-amine is obtained from the salt by treating the latter with an excess of NaOH, extracting with ether, drying the ether solution with anhydrous $K_2CO_3$, and distilling at atmospheric pressure. It has a boiling point of 124.5–126.0° C. at 770 mm.; optical rotation, $$(\alpha)_D^{25} = +17.1°$$

*l-form.*—Dimethylaminoisopropanol having a boiling point of 124–126° C., is treated with 1.05 mols of d-tartaric acid in 95% alcohol solution. The salt is recrystallized from a mixture of 6 cc. 96% alcohol per gram of salt. After repeated recrystallizations, a salt is obtained having rotation, $$(\alpha)_D^{25} = -10.7°$$

The laevo-amine is obtained from the salt by treating the same with an excess of NaOH, extracting with ether, drying the ether solution with anhydrous $K_2CO_3$, and distilling at atmospheric pressure. It has a boiling point of 125°, and optical rotation, about $$(\alpha)_D^{25} = -15°$$

The racemic amine may also be resolved into its d- and l-forms by treating it with bromo-camphorsulphonic acid to separate out the dextro-form, removing the bromo-camphorsulphonic acid from the salt, and treating the residue of the amine thus liberated with d-tartaric acid to obtain the laevo form after further purification. The reverse of the process may also be followed by first treating the racemic amine taric acid to resolve the laevo-form, removing the d-tartaric acid, and treating the residue of the amine with bromo-camphorsulfonic acid to obtain the dextro-form, all substantially in the manner described.

*Preparation of d- and l-β-methylcholine iodides*

The methiodides of the respective amines are prepared by treating the latter with methyl iodide in ether solution at room temperatures. They are recrystallized from hot absolute alcohol to which about 30% acetone is added after solution. The d-β-methylcholine iodide has a melting point of 176–177° C., and optical rotation, $$(\alpha)_D^{25} = +24.7°$$

the l-β-methylcholine iodide has a melting point of 176.5–177.5°C., and, $$(\alpha)_D^{25} = -24.7°$$

*Preparation of d- and l-β-methylcholine chlorides*

The d- and l-β-methylcholine chlorides are prepared by reacting upon the respective iodides with AgCl in alcohol solution. The silver salts formed in the reaction are removed by filtration. The last traces of silver chloride are removed by passing hydrogen sulfide into the solution. Charcoal is added and the mixture filtered. The filtrate is concentrated to a gummy consistency, and then the salts are recrystallized from butyl alcohol. The d-β-methylcholine chloride has a melting point of 165–167° C., and $$(\alpha)_D^{25} = +38.8°$$

the laevo-form, a melting point of 165–167°, and $$(\alpha)_D^{25} = -38.2°$$

*Preparation of d- and l-β-methylcholine salts*

In general, various salts of d- and l-β-methylcholine may be prepared by reacting upon the methiodides of the respective isomers with the corresponding silver salt of an acid whose silver salt is more soluble than silver iodide.

*Preparation of acetyl d- and l-β-methylcholine chloride*

The d- and l-β-methyl choline chlorides are acetylated according to the method described by Major and Cline in their aforementioned co-pending application Serial No. 733,604. According to this method a mixture of one molecular portion of the corresponding isomer of β-methylcholine chloride with seven molecular portions of acetic anhydride is heated for three to six hours at 100° C. Dry ether is then added to the cooled solution. The precipitate which forms is washed several times with ether and then dissolved in absolute alcohol. This solution is first decolorized with activated charcoal, and then the acetylated compound reprecipitated by the addition of dry ether. The products obtained are white crystalline hygroscopic solids. The dextro-form has a melting point of 200–201°;

$$(\alpha)_D^{25} = +41.9°$$

The laevo-form has a melting point of 201–202° C.;

$$(\alpha)_D^{25} = -41.3°$$

A mixture of equal quantities of the d- and l-forms gives a mixed melting point of 172–173° C.

The racemic forms of all the intermediate and ultimate products are readily produced by the same steps throughout without resolving the racemic dimethylaminoisopropanol into its optical isomers, thus:

Racemic dimethylaminoisopropanol
+ methyl iodide →
β-methyl-choline iodide
+ Silver salt →
β-methyl-choline salt
+ acylating agent →
Racemic acyl-β-methyl-choline salt.

It will be apparent that various modifications may be made in any of the steps in the processes as described without departing from the spirit and scope of the invention.

We claim as our invention:—

1. The process of producing optically active isomers of acyl-β-methyl choline salts, which comprises the steps of resolving dimethylaminoisopropanol into its dextro and laevo forms by treating the racemic form of the amine, with an acid of the group consisting of bromo-camphorsulphonic acid and d-tartaric acid, subsequently treating the resolved forms thus obtained with methyl iodide to form their methiodides, and thereafter converting the methiodides into the desired salts by reacting upon them with the silver salt of a corresponding acid whose silver salt is more soluble than silver iodide, and acylating the salt thus obtained.

2. Acetyl d-β-methylcholine chloride being in the form of a white hygroscopic crystalline solid, having, in its pure form a melting point of about 200–201° C., and optical rotation about $$(\alpha)_D^{25} = +41.9°$$

3. Acetyl l-β-methylcholine chloride being in the form of a white hygroscopic crystalline solid, having, in its pure form a melting point of about 201–202° C. and optical rotation about $$(\alpha)_D^{25} = -41.3°$$

4. The process of producing acyl-β-methylcholine salts which comprises the steps of treating dimethylaminoisopropanol with methyl iodide to form its methiodide, and thereafter converting the methiodides into the desired salts by reacting upon them with the silver salt of a corresponding acid whose silver salt is more soluble than silver iodide, and acylating the salt thus obtained.

5. Optically active acetyl-β-methylcholine salts of acids whose silver salts are more soluble than silver iodide.

6. The process of producing d-acyl-β-methyl choline salts which comprises the steps of resolving dimethylaminoisopropanol into its dextro form by treating the racemic form of the amine with bromocamphorsulfonic acid, subsequently treating the dextro form thus obtained with methyl iodide to form its methiodide, thereafter converting the methiodide into the desired salt by reacting upon it with the silver salt of an acid whose silver salt is more soluble than silver iodide, and acylating the salt thus obtained.

7. The process of producing l-acyl-β-methyl choline salts which comprises the steps of resolving dimethylaminoisopropanol into its laevo form by treating the racemic form of the amine with d-tartaric acid, subsequently treating the laevo form thus obtained with methyl iodide to form its methiodide, thereafter converting the methiodide into the desired salt by reacting upon it with the silver salt of an acid whose silver salt is more soluble than silver iodide, and acylating the salt thus obtained.

RANDOLPH T. MAJOR.
HOWARD T. BONNETT.